United States Patent [19]

Welborn

[11] Patent Number: 4,579,356
[45] Date of Patent: Apr. 1, 1986

[54] CHUCK KEY HOLDER

[76] Inventor: Woodrow W. Welborn, Rte. 12, Box 400, Laurel, Miss. 39440

[21] Appl. No.: 646,190

[22] Filed: Aug. 31, 1984

[51] Int. Cl.$^4$ ............................................. B25B 13/44
[52] U.S. Cl. ................................ 279/1 K; 24/17 AP; 24/274 WB; 248/314
[58] Field of Search ...................... 279/1 K; 81/90 A; 408/241 R; 24/17 AP, 30.5 P, 274 WB; 248/314

[56] References Cited

U.S. PATENT DOCUMENTS 3,947,924 4/1976 Fox et al. ...................... 279/1 K X
4,032,160 6/1977 Karasa et al. ...................... 279/1 K
4,068,978 1/1978 Brock ........................... 279/1 K X

FOREIGN PATENT DOCUMENTS 657921 4/1979 U.S.S.R. ............................. 279/1 K

Primary Examiner—Fred Silverberg
Attorney, Agent, or Firm—Edwin E. Greigg

[57] ABSTRACT

A chuck key storage attachment for use with an electric drill for conveniently storing a chuck key. The attachment is retained against the body of the drill itself by a chuck key retention means which in turn retains the chuck key in the attachment. The chuck key storage attachment provides for several sizes of aperture for accommodation of the various sizes of chuck keys available in the market place.

5 Claims, 3 Drawing Figures

CHUCK KEY HOLDER

BACKGROUND OF THE INVENTION

The present invention relates to attachments for electric drills are more particularly to chuck key storage attachments.

When using an electrical appliance such as a portable drill, it is often desirable to have an accessory, such as a chuck key, conveniently attached to the drill. If the chuck key is not so attached to the drill, it may become lost, misplaced, or otherwise be inconvenient for use. It has been well known in practice to tie, tape, or wire the chuck key to the electric cord supplying the power to the electric drill. Such an attachment means to the power cord has its disadvantages, however, in that it is difficult to freely turn the chuck key and the chuck key so tied often interferes with free movement of the power cord over obstacles and can possibly mar the surface over which it moves. Furthermore, the chuck key attached to the electric cord is typically remote from the electric drill and therefore inconveniently located with respect to the operator of the drill.

A further factor relating to the storage of chuck keys, and the provision of an attachment for an electric drill for that purpose, is that chuck keys are not of universal or standard design and therefore they can vary in size to suit the chuck of a particular drill with which it is provided. Therefore, the chuck key for a given drill will not necessarily fit the chuck of another drill of another manufacturer. Thus, in order to provide the greatest utility in an accessory for the "after-market" for electric drills, it is appropriate to provide an attachment for the storage of more than one size of drill chuck key. To the inventor's knowledge the prior art has not dealt with the provisions of multiple chuck keys nor the provision of such keys in the easily attachable and removable manner provided by the present invention.

Other solutions to the provision of an attachment for an electric drill, and for the storage of chuck keys, include U.S. Pat. No. 3,049,946 to Robert K. Schelke. The Schelke patent provides for a strain relief attachment to the electric cord of a drill, providing a single chuck key storage hole. In that device, the chuck key is again inconveniently mounted with respect to the drill on the electric cord. The disadvantages discussed above with respect to that location of mounting are not overcome by that device.

U.S. Pat. No. 3,947,924 to James C. Fox et al provides for a drill housing mounted chuck key storage apparatus. This attachment essentially provides for a position of storage and a position of use 180 degrees opposite to the position of storage. Such device requires alignment upon installation of the drill, and provides for the storage of only one drill chuck key. Therefore, the apparatus must be custom designed to suit each size chuck of known manufacture. Such a construction complicates the use of the storage apparatus, requires that multiple apparatuses be provided in the after-market to suit the various size chuck keys and otherwise offers the possibility of breakage or deformation and therefore difficulty of use.

OBJECTS OF THE INVENTION

It is an object of the invention to provide a chuck key storage attachment for an electric drill which is adapted to receive and retain multiple sizes of drill chuck keys.

It is another object of the invention to provide a simple attachment for the drill for storage of the chuck key adjacent to the body of the drill.

It is still another object of the invention to provide a chuck key storage attachment for an electric drill which can be easily mounted upon and released from the drill by an elastic retainer piece.

It is a still further object of the invention to provide a single chuck key storage attachment for after-market purchase for electric drills which is adapted to suit any of the common sizes of chuck keys provided by manufacturers with their electric drills.

Other objects and advantages of the invention will become apparent by reference to the description and the accompanying drawings.

SUMMARY OF THE INVENTION

The present invention is a chuck key storage attachment for use with an electric drill which is adapted to be mounted upon the housing of the electric drill. The attachment includes an elastic retainer means adapted to be connected about the body of the drill so as to retain the chuck key storage attachment in place against the housing of the drill. The chuck key storage attachment is substantially crescent-shaped and provided with apertures of varying diameters, into which apertures chuck keys of various sizes may be stored and retained. The elastic retention means which holds the chuck key storage attachment to the body of the drill is fitted over the attachment via a groove cutaway in the body of the chuck key storage attachment, which groove intersects the apertures for insertion of the chuck keys. In this fashion upon insertion of a chuck key into an appropriately sized aperture, the elastic means grabs not only the chuck key attachment itself, but also the shank of the chuck key via that portion of an aperture which is revealed by the groove. The elastic retention means or rubber band may allow the storage attachment to be removed and remounted on another drill easily and quickly.

DESCRIPTION OF THE DRAWINGS

A better understanding of the present invention will be had upon reference to the accompanying drawings like numerals refer to like parts in the several views and in which.

DESCRIPTION OF THE PREFERRED EMBODIMENT

Figure 1:
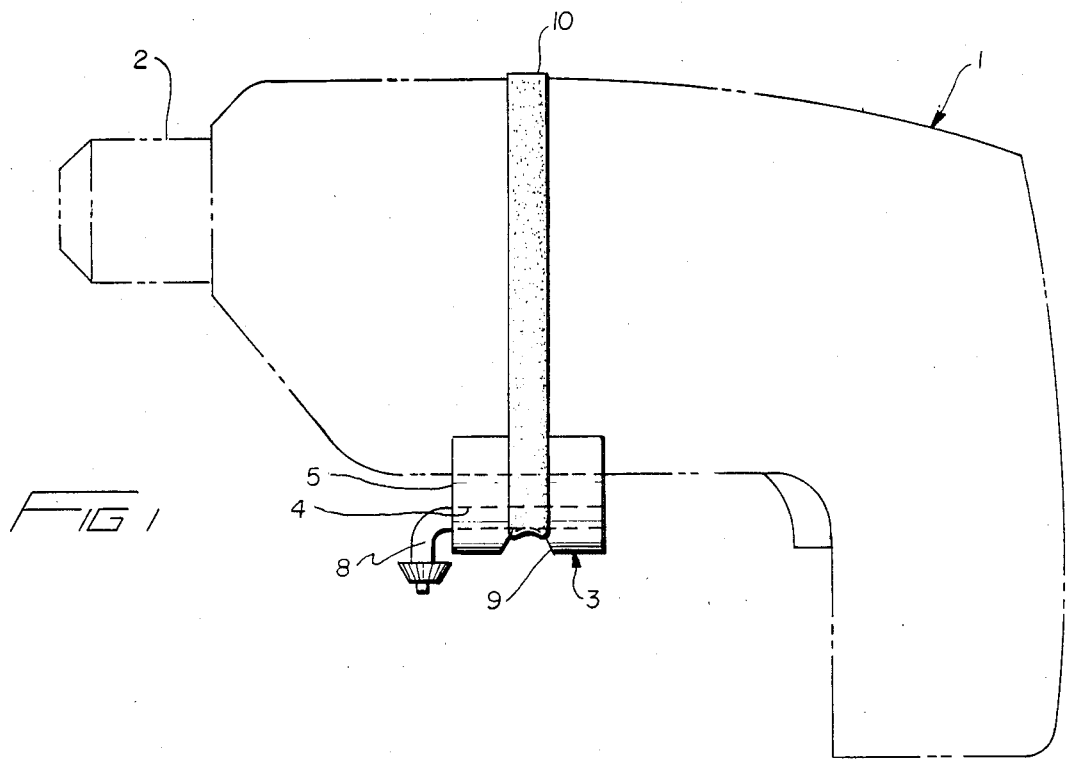
FIG. 1 is a side view of an electric drill showing a preferred embodiment of a chuck key storage attachment affixed thereto.

Referring now to FIG. 1, there is shown an electric drill 1 provided with a chuck 2 for holding a drill (not shown). The chuck 2 is adapted for operation in known manner by a chuck key 8 to allow the user of the drill to selectively loosen the chuck to remove the drill bit and tighten the chuck to retain the drill bit therein. A chuck key storage attachment, generally denoted as 3, is shown removably attached to the electric drill 1 by, for example, an elastic retention means or rubber band 10. The chuck key storage attachment as shown in FIG. 1, mounted upon the drill by the elastic retention means 10, includes a leading end 5 in which are provided apertures for 4 of varying diameters for reception of chuck keys, such as 8, in an appropriately sized aperture.

Figure 2:
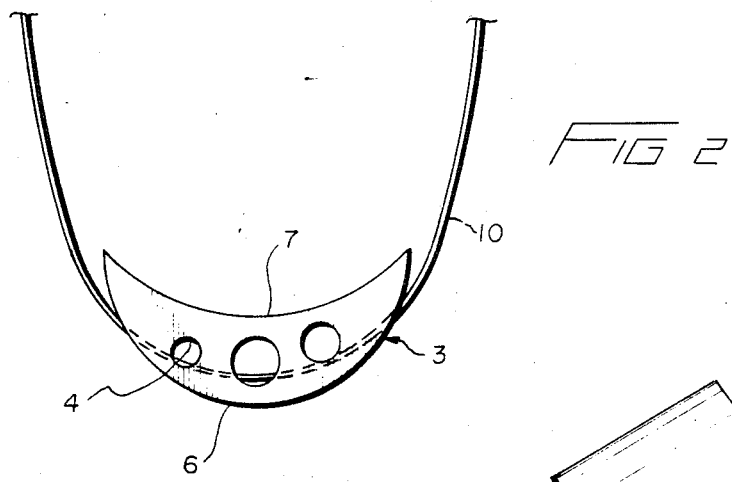
FIG. 2 is an end view of the chuck key storage attachment showing the crescent shape thereof and the several apertures of varying diameters therein and the elastic retention means.

Referring now to FIG. 2, the generally crescent shape of the drill chuck key storage attachment 3 is shown, the crescent shape being provided by outer and inner walls 6 and 7, respectively. In the preferred embodiment of the device the outer and the inner walls are arcuate in shape each arc having a different radius of curvature so as to provide an intersection as a crescent shape. As shown best in FIG. 2, the radius of curvature of the outer wall 6 is less than that of the inner wall 7. FIG. 2 also illustrates the varying diameters of the several apertures 4 into which the chuck keys for an electric drill are inserted. The keys are retained by the elastic retention means 10 within the appropriate aperture by cooperation with the groove 9 intersecting the several apertures.

Figure 3:
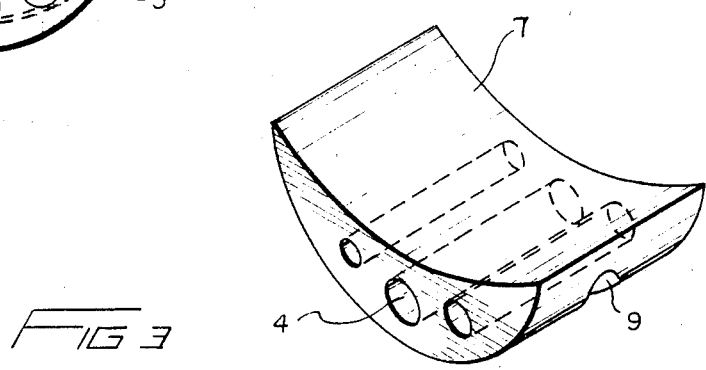
FIG. 3 is a perspective view of the chuck key storage attachment.

FIG. 3 shows perspectively the apertures provided in the chuck key storage attachment and the recess or groove 9 cut into the outer wall 6 of the attachment.

Referring again to FIG. 1, this view of the chuck key storage attachment illustrates the intersection of an aperture 4 and the groove 9. The groove as shown is provided with sloping walls which have a depth greater than the thickness of the wall between the surface of outer wall 6 and the inner wall of aperture 4. In this fashion the recess cuts into and reveals a portion of each of the several apertures 4.

In practice, the chuck key storage attachment would be placed on the body of the drill as desired and the elastic retention means or rubber band would encompass the drill body fitting into the groove 9 on the attachment 3. Thereupon, a chosen chuck key for use with a specific drill application could be inserted into an appropriately sized aperture in the chuck key storage attachment 3 and the rubber band 10 by contact with the shaft of the chuck key would retain the chuck key within the storage attachment. Therefore, the chuck key storage attachment is held to the body of the drill by the rubber band and the rubber band also serves to hold the chuck key in the chuck key storage attachment.

From the foregoing, it can be seen that a novel chuck key storage attachment is provided which is also adapted to receive and hold multiple sizes of chuck keys for various manufacturers of drills. A given chuck key is securely held so that it cannot be lost and yet the retention is such that it can easily be removed for use. Finally, the construction of the chuck key storage attachment is such that it may be easily and quickly connected to an electric drill.

The foregoing detailed description is given primarily for clarity of understanding and no unnecessary limitations should be read therefrom, for modifications will be obvious to those skilled in the art upon reading this disclosure and may be made without departing from the spirit of the invention or the scope of the appended claims.

What is claimed and desired to be secured by Letters Patent of the United States is:

1. A separate attachment for an electric drill comprising a body member having a longitudinal extent, said body member being provided with at least one means defining an aperture parallel to said longitudinal extent for reception of one end of a chuck key, said body member being further provided with a lateral recess intersecting said at least one means defining an aperture, said electric drill having a housing, said lateral recess receiving an elastic means that surrounds said housing and said body member, said elastic means in said lateral recess extending into said at least one means defining an aperture to directly engage said one end of the chuck key to mount said attachment on said electric drill and to retain said one end of said chuck key within said at least one means defining an aperture, whereby the chuck key is prevented from loss but remains convenient for use.

2. An attachment for an electric drill as claimed in claim 1, in which said body member is provided with an inner and an outer arcuate surface forming a substantially crescent-shaped cross-section thereof.

3. An attachment for an electric drill as claimed in claim 2, in which said inner and outer arcuate surfaces have different radii of curvature.

4. An attachment for an electric drill as claimed in claim 1, in which said at least one means defining an aperture comprises plural means of varying diameters.

5. An attachment as claimed in claim 4, in which said lateral recess lies perpendicularly to said plural means defining apertures of varying diameters and terminates inwardly from a lateral extent of said body member.

* * * * *